Oct. 18, 1966  R. E. FREATHY ETAL  3,279,798
AUTOMATIC SHUT-OFF MECHANISM FOR RECORD CHANGERS
Filed July 8, 1963  3 Sheets-Sheet 3
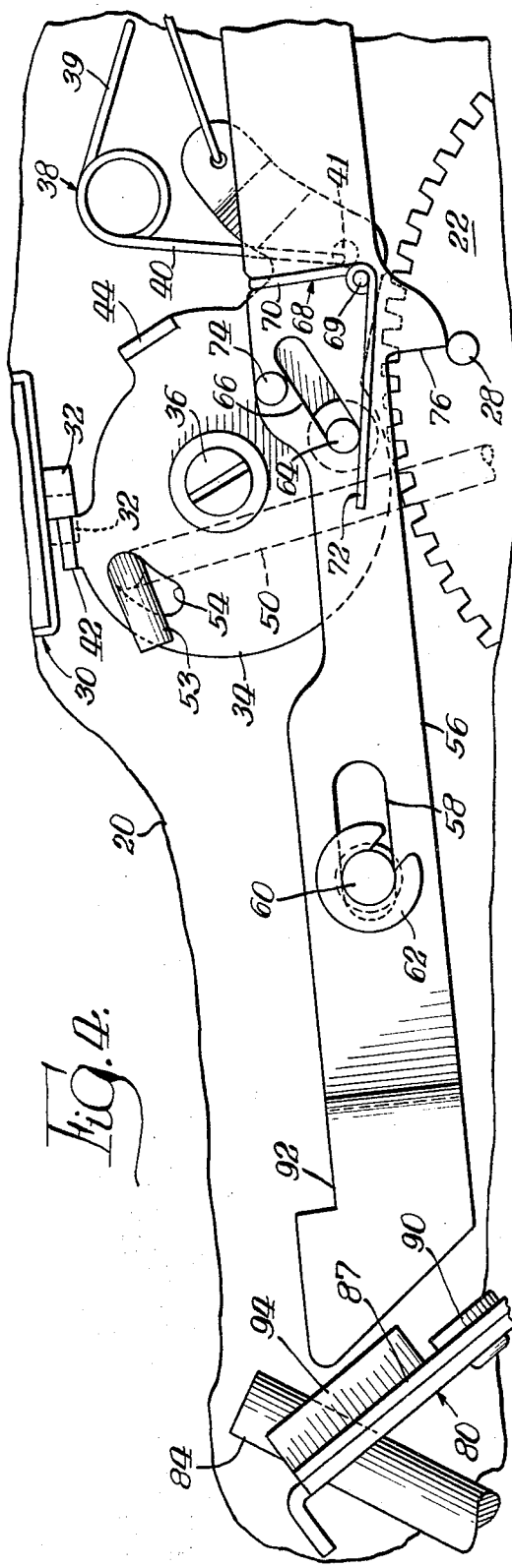
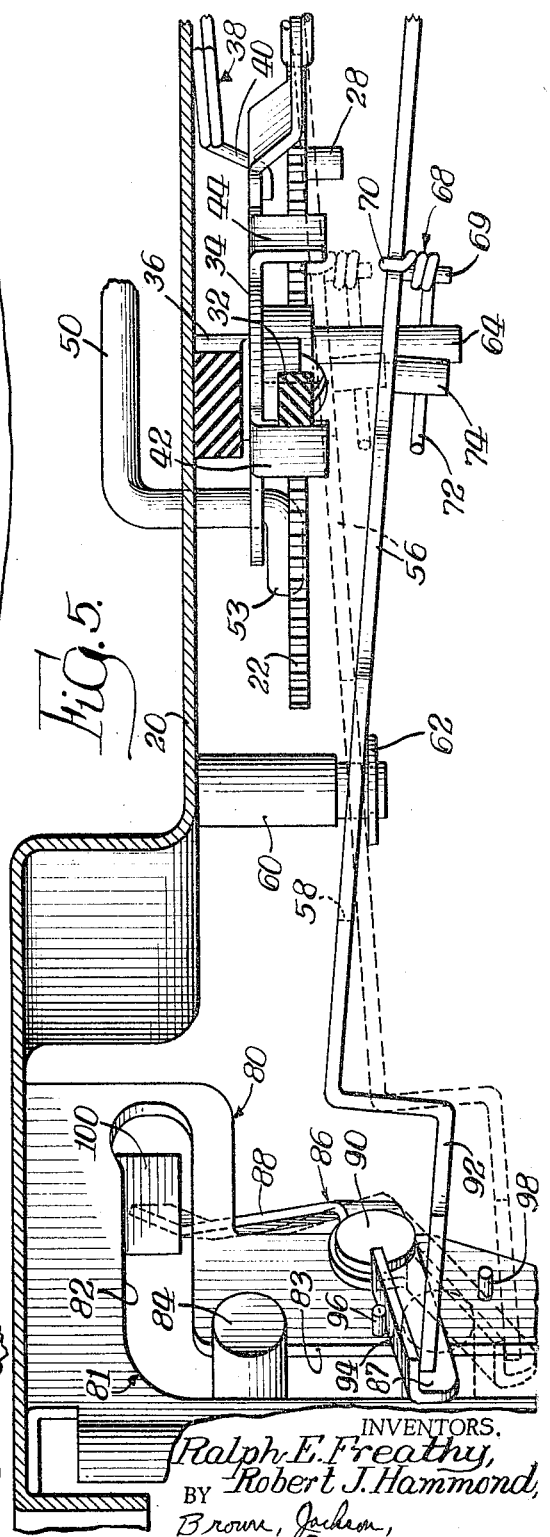
INVENTORS.
Ralph E. Freathy,
Robert J. Hammond,
BY Brown, Jackson,
Boettcher & Dienner
Attys.

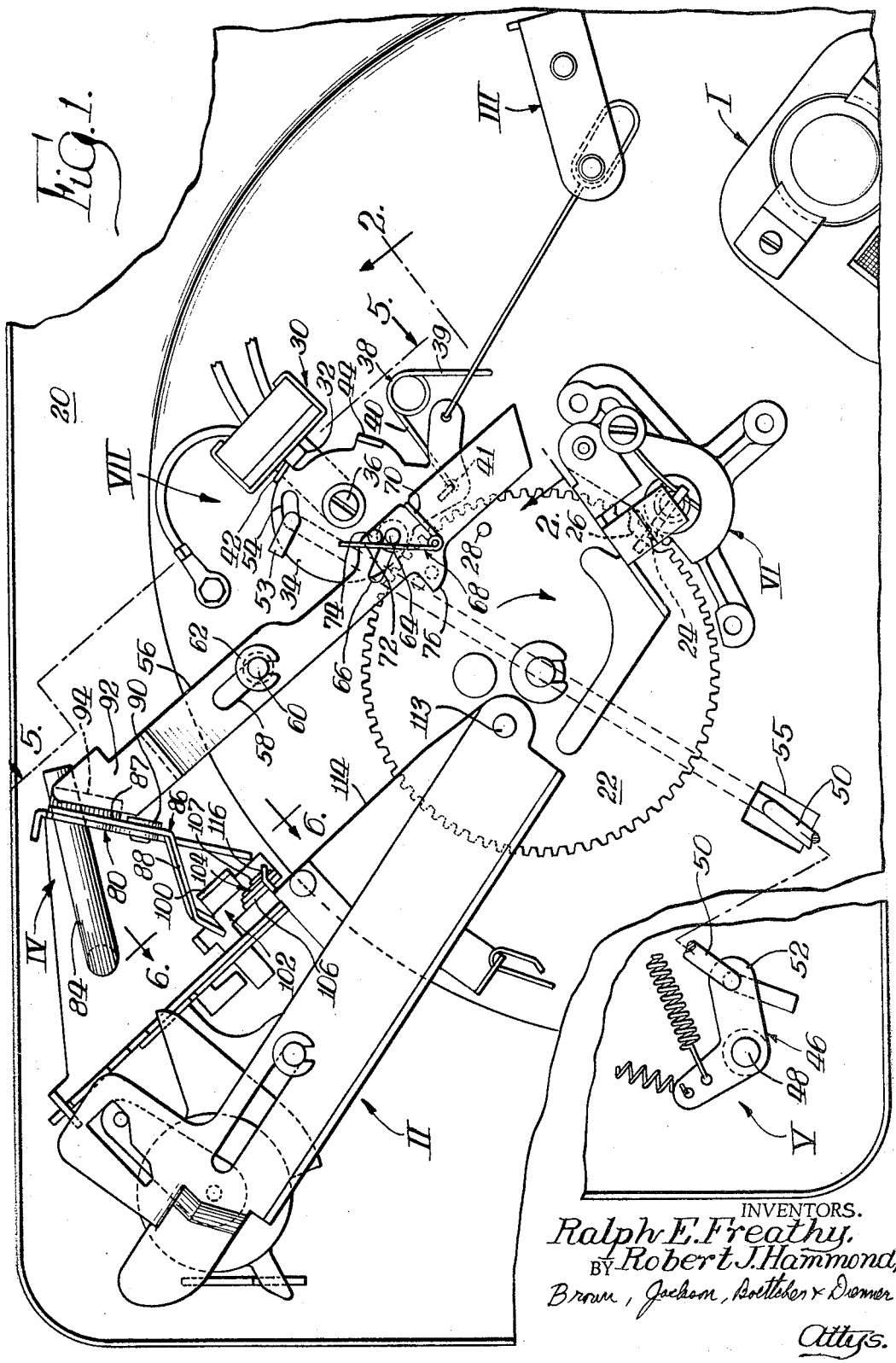

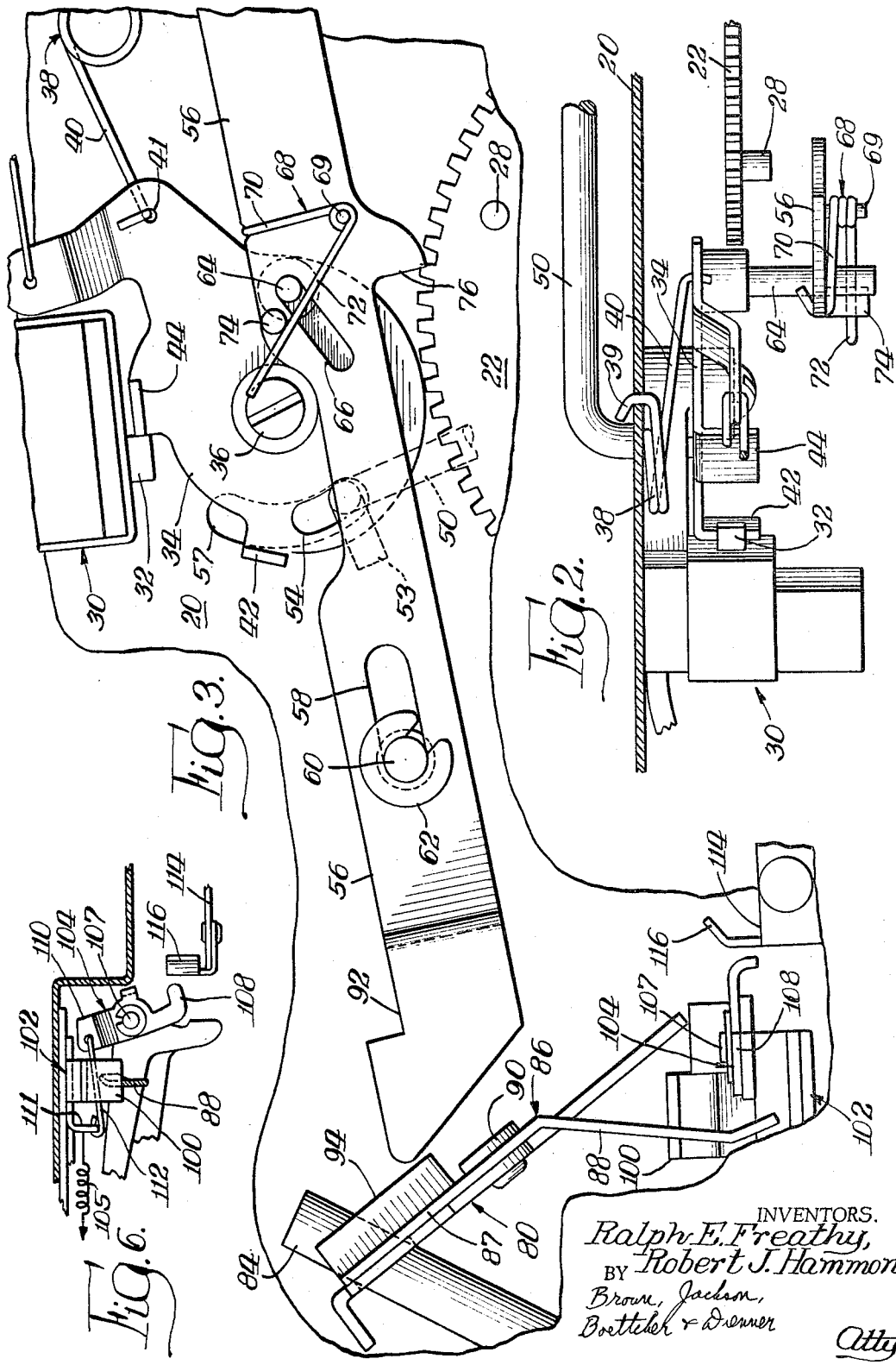

United States Patent Office 3,279,798
Patented Oct. 18, 1966

3,279,798
AUTOMATIC SHUT-OFF MECHANISM FOR RECORD CHANGERS
Ralph E. Freathy and Robert J. Hammond, Stevensville, Mich., assignors to V-M Corporation, Benton Harbor, Mich., a corporation of Michigan
Filed July 8, 1963, Ser. No. 293,424
6 Claims. (Cl. 274—10)

The present invention relates to mechanism for automatically shutting off a record changer after the last record has been played.

Record changers are normally provided with an on-off switch, and with a manually operable knob or lever which is conveniently mounted at the top of the base plate and is linked with a switch actuating member whereby the record changer may be turned off by simply moving the knob to its "off" position. It is also known to provide automatic shut-off mechanism in conjunction with such manual control means. Such automatic mechanism may be associated with the same switch actuating member as the manual control, and may be designed so as to move the switch actuating member to its "off" position after the last record has been played.

One of the main problems encountered with mechanism of the foregoing type relates to the fact that both manual and automatic shut-off means are provided which cooperate with the same switch actuating member, and in certain instances the two shut-off means may be operated in opposition to one another. Thus, many operators of a record changer will hold the manual control knob in its "on" position after the completion of the playing of the last record for the purpose of preventing the record changer from being turned off by the automatic shut-off mechanism. In such instances the automatic shut-off means is operated in opposition to the manual means and damage to the mechanism commonly occurs. A similar problem is encountered whenever the manual on-off control mechanism becomes jammed in its "on" position, since here too such mechanism will operate in opposition to the automatic shut-off means after the last record has been played.

It is an object of the present invention to provide an improved automatic shut-off mechanism for record changers which is relatively inexpensive to manufacture and unusually efficient and durable in its operation.

A further object of the invention is to provide automatic shut-off mechanism for use in a record changer also equipped with manual on-off control means, wherein the automatic shut-off mechanism includes yieldable means which permits it to pass through its cycle of operations without exerting a positive force on an associated switch actuating member so as to avoid damage to the mechanism in the event the manual control means associated with the same switch actuating member is being held or is jammed in its "on" position.

Other advantages and uses of our invention will be apparent, or become so, as we describe our invention in greater detail in conjunction with the accompanying drawings in which:

FIGURE 1 is a bottom plan view, partly broken away, of a record changer equipped with automatic shut-off mechanism constructed in accordance with the present invention, there being shown an associated switch and a switch actuating member which are illustrated in the "on" position;

FIGURE 2 is an enlarged fragmentary sectional view taken substantially along the line 2—2 of FIGURE 1;

FIGURE 3 is an enlarged fragmentary bottom plan view of the principal components of the automatic shut-off mechanism of the present invention, there being shown an associated switch and a switch actuating member which are illustrated in their "off" positions;

FIGURE 4 is a view similar to FIGURE 3 showing the manner in which the automatic shut-off mechanism is adapted to yield during its cycle of operations in the event that an associated switch actuating member is being positively held in the "on" position by manual control means;

FIGURE 5 is an enlarged fragmentary sectional view taken substantially along the line 5—5 of FIGURE 1 showing in particular a pivotable shut-off lever, the latter being shown in solid lines in its normal inoperative position and in dash lines in its operative position to which it is moved after the playing of the last record; and FIGURE 6 is a fragmentary sectional view taken substantially along the line 6—6 of FIGURE 1.

Referring now to the drawings, there is shown in FIGURE 1 the underside of a record changer baseplate 20 on which is mounted a large diameter drive gear 22. A pinion 24 formed on the turntable shaft is adapted to drive the gear 22 through one revolution during each record change cycle. In its normal inoperative position as shown in FIGURE 1 the gear 22 is disposed with a cutout portion 26 thereof in alignment with the pinion 24 so that there is no driving connection therebetween. However, at the completion of the playing of a record the gear 22 is rotated slightly to cause it to mesh with the continuously rotating pinion 24 whereby the gear will be rotated one revolution in a clockwise direction as viewed in FIGURE 1 until the cutout portion 26 is again aligned with the pinion. The foregoing description of the manner of driving the gear 22 is believed sufficient for purposes of the present application since such drive mechanism is well known in the art and its relevance here resides primarily in the fact that we provide a small stud 28 which projects downwardly from the underside of the gear 22 and serves to actuate the automatic shut-off mechanism of the present invention.

FIGURE 1 further shows a phonograph drive motor I, actuating means II driven by the gear 22 for controlling the operation of a tone arm (not shown), speed changing mechanism III for changing the speed of rotation of the turntable, mechanism IV for sensing when the last record has been played, manual shut-off control means V, mechanism VI for mounting and controlling the operation of a spindle (not shown), and automatic shut-off mechanism VII. The present invention is primarily concerned with the automatic shut-off mechanism VII, although it also relates to the mechanism IV for sensing the completion of the playing of the last record since the latter mechanism is utilized to initiate the operation of the automatic shut-off mechanism.

A combination electrical connector and switch device 30 is mounted to the baseplate 20 and includes a button 32 which is movable laterally between an "on" position and an "off" position to control the operation of the phonograph motor I. FIGURE 4 shows the button 32 in solid lines in its right hand or "on" position and in dash lines in its left hand or "off" position. The button 32 is moved between its two positions by means of a rotary switch actuating plate 34 rotatably mounted on a pin or the like 36 which is supported from the baseplate 20. An over-center or toggle spring 38 is associated with the switch actuating plate 34 and comprises one arm 39 which is anchored to the baseplate 20 and a second arm 40 which is connected to the actuating plate at 41.

The switch actuating plate 34 is rotatable on the pin 36 and is provided with a pair of circumferentially spaced downwardly projecting tabs 42 and 44 which alternately engage the button 32 to move the same to a corresponding one of its two positions. Thus, viewing FIGURE 1, the rotary plate 34 is shown in its clockwise or "on" position, and when it is moved to its clockwise position the tab 42 engages the button 32 and moves it laterally to its "on" position. In a similar manner, when the rotary plate 34 is moved to its counterclockwise position as shown in FIGURE 3, the tab 44 engages the button 32 and moves it laterally to its "off" position. It will be understood that when the actuating plate 34 is moved approximately past center toward a given one of its two rotary positions, the over-center spring 38 will carry it the remaining portion of its travel thus assuring actuation of the button 32 in the desired manner.

The manual control means V will now be described and as shown in FIGURE 1 a bellcrank member 46 is disposed at the underside of the baseplate 20 and is mounted on a pin 48 which is rotatably supported from the baseplate. A manually operable control knob (not shown) is disposed at the top of the baseplate 20 and is mounted on the pin 48 to permit manual rotation of the bellcrank 46. One end of a control rod 50 is connected to an arm 52 of the bellcrank 46 and the other end of the rod comprises a bent portion 53 which extends through a slot 54 in the rotary plate 34 so as to be connected thereto. It will be noted that the rod 50 extends upwardly through an opening 55 in the baseplate 20 so that for a substantial portion of its length the rod passes above the baseplate, and a second opening 57 (see FIGURE 3) is provided in the baseplate immediately above the rotary switch actuating plate 34 to permit the rod end 53 to pass downwardly therethrough for connection with the plate 34.

It will be seen from the foregoing that when the manual control knob is turned to rotate the bellcrank 46 to its counterclockwise position (as viewed in FIGURE 1) the rod 50 will be pushed toward the rotary plate 34 and upon engagement at the end of the slot 54 therein it will rotate the plate 34 to its clockwise or "on" position. Similarly, when the bellcrank 46 is rotated to its clockwise position it will pull the control rod 50 and will thereby rotate the actuating plate 34 to its counterclockwise or "off" position.

In order to automatically rotate the switch actuating plate 34 to its counterclockwise or "off" position after the last record has been played, there is provided a shut-off lever 56. The shut-off lever 56 has a longitudinal slot 58 formed therein, and the lever is mounted so that a stud 60 which projects downwardly from the baseplate 20 extends through the slot 58. The lever 56 is secured on the stud 60 by means of a lock washer 62 which is fastened to the lower end of the stud, but the lever may be pivoted a limited amount about the stud in a vertical direction, that is, the lever may be pivoted about a horizontal axis passing through the stud between the normal inoperative position shown in solid lines in FIGURE 5 and the operative position shown in dash lines therein.

Referring now to FIGURE 3, the rotary switch actuating plate 34 carries a stud or pin 64 which projects downwardly through an inclined slot 66 formed in the shut-off lever 56. The shut-off lever 56 carries a spring 68 coiled about a small pin 69 which extends downwardly from the lever. The spring 68 has one arm 70 which is bent through a recess in the side edge of the lever 56 so as to be anchored thereto, and a second arm 72 which bears against a stud 74 which projects downwardly from the lever. The spring 68 is pre-loaded in such a manner that the arm 72 bears against the stud 74 with a predetermined force.

In order to provide an operative connection between the shut-off lever 56 and the rotary plate 34, the two parts are relatively positioned so that the downwardly extending stud 64 on the rotary plate projects through the slot 66 in the lever between the right hand end of the slot and the spring arm 72. Accordingly, when the shut-off lever 56 is moved downwardly and to the right as viewed in FIGURE 1 it will carry the spring 68 with it, and the spring arm 72 will thereby exert a force on the stud 64 sufficient to rotate the switch actuating plate 34 to is counterclockwise or "off" position FIGURE 3 (which is oriented somewhat differently than FIGURE 1) shows the shut-off lever 56 after it has moved the rotary plate 34 to its counterclockwise or "off" position thus causing the switch button 32 to be moved to its "off" position. When the switch is again turned on by manually rotating the bell-crank 46 to its counterclockwise position (as viewed in FIGURE 1), the movement of the stud 64 on the rotary plate 34 will act upon the associated spring arm 72 on the shut-off lever 56 to return the latter to its original position.

The shut-off lever 56 has a laterally projecting ledge portion 76 which is integral therewith and is adapted to be engaged by the stud 28 which projects downwardly from the underside of the large drive gear 22. When the lever 56 is in its inoperative pivotal position as shown in solid lines in FIGURE 5, the ledge portion 76 is disposed beneath the path of travel of the stud 28, and the automatic shut-off mechanism will be inoperative. However, if the lever 56 is in its operative pivotal position as shown in dash lines in FIGURE 5, the ledge portion 76 will be located in the rotary path of travel of the stud 28, and when the gear 22 is rotated through one revolution during a record change cycle the stud will engage the ledge portion and move the lever 56 downwardly and to the right as viewed in FIGURE 1 so as to cause the mechanism to be shut off in the manner hereinabove described. As the shut-off lever 56 is actuated so as to rotate the actuating plate 34, the lever is pivoted somewhat about the mounting stud 60 so as to be moved radially out of the path of the stud 28 as shown in FIGURE 3, whereby the gear 22 is free to continue its rotary motion. It will also be noted that the longitudinal movement of the lever 56 is limited by the length of the slot 58 through which the fixed stud 60 projects.

It is an important feature of the present invention that the spring 68 provides a yielding connection between the shut-off lever 56 and the rotary switch actuating plate 34 which will prevent damage to the mechanism in the event the plate 34 is jammed or held in its clockwise or "on" position. As mentioned hereinabove, many operators of record changers will hold the manual control knob which operates the bellcrank 46 in the "on" position after the last record has been played so as to prevent the mechanism from being turned off. Consequently, the rotary plate 34 is held in its "on" position. In such instances, the spring arm 72 will bend in the manner shown in FIGURE 4 thus avoiding damage to the mechanism. The spring arm 72 will yield sufficiently to permit the shut-off lever 56 to be moved approximately to the position shown in FIGURE 4 whereby the stud 28 will be able to clear the ledge portion 76, after which the shut-off lever will be returned to its original position by the spring 72, and the rotary plate 34 and the switch button 32 will remain in their "on" positions. Such movement of the lever 56 with respect to the temporarily fixed rotary plate 34 and stud 64 is permitted until the stud engages the opposite end of the slot 66 formed in the lever, as shown in FIGURE 4, and such limited relative movement is sufficient to permit the ledge portion 76 to be moved out of the way of the stud 28 on the large gear 22 so that the stud 28 will move past the ledge without shutting off the mechanism. It will be understood that the pre-loading of the spring arm 72 will during normal operation provide sufficient force to readily overcome the toggle spring 38 so as to rotate the plate 34 to its "off" position, and on the other hand it is sufficiently flexible as to bend in the manner shown in FIGURE 4 when the plate 34 is held or jammed in its "on" position.

The manner in which the shut-off lever 56 is moved from its normal inoperative position as shown in solid lines in FIGURE 5 to its operative position as shown in dash lines therein will now be described. A bracket 80 is secured to the underside of the baseplate 20 so as to extend downwardly therefrom. An L-shaped slot 81 having a horizontal portion 82 and a vertical portion 83 is formed in the bracket 80 for guiding the lower end 84 of a record support rod. Those skilled in the art are fully familiar with the usual record support arm (not shown) which is disposed on the top of a stack of records for stabilizing the same on the spindle, and it is also well known that such arms are commonly mounted on a vertical rod having a bent horizontal lower end portion such as shown at 84 which is guided in an L-shaped slot as shown at 81. Accordingly, it is not believed that a further description of a record support arm or its operation is necessary for purposes of understanding the present invention.

A bellcrank lever 86 having a first arm portion 87 and a second arm portion 88 is pivotally mounted on the bracket 80 by a rivet or the like 90. The shut-off lever 56 has an offset extension 92 and the bellcrank arm 87 has a bent tab 94 which overlies the end of the extension 92 to permit the bellcrank to control the pivotal position of the shut-off lever. As shown in FIGURES 1 and 5, the greater portion of the shut-off lever 56 is disposed on the side of the mounting stud 60 which is proximate the drive gear 22, and thus the lever will normally be disposed in its inoperative pivotal position as shown in solid lines in FIGURE 5 due to the force of gravity. However, it will be understood that if the bellcrank 86 is rotated in a counterclockwise direction to the position shown in dash lines in FIGURE 5, the tab 94 will urge the extension 92 downwardly so as to pivot the shut-off lever 56 to the operative position shown in dash lines.

As described earlier herein, when the lever 56 is in the solid line position it is inoperative because the ledge portion 76 thereon is disposed beneath the path of movement of the stud 28 on the drive gear 22, whereas when the lever is in the dash line position it will be pressed against the underside of the gear 22 and the ledge will be disposed in the path of the stud 28 to be engaged thereby. It will be noted that a pair of small pins 96 and 98 project from the bracket 80 and cooperate with the bellcrank arm 87 to limit the range of rotary travel of the bellcrank 86. The bellcrank 86 is so balanced on the pin 90 that the force of gravity will bias it to the clockwise position shown in solid lines in FIGURE 5.

The rod end 84 is shown in a raised position in the vertical guide slot 83 in FIGURE 5 wherein it is disposed above the bellcrank arm 87, and it should be understood that it will be in a raised position when the associated record support arm (not shown) is supported on top of a stack of records on the spindle. Each time a record is dropped from the spindle to the turntable the support or stabilizer arm together with the rod portion 84 will be lowered an amount equal to the thickness of a record, and when the last record has been dropped the rod end 84 will have moved downwardly in the slot 83 so as to engage the bellcrank arm 87 and urge the bellcrank toward the counterclockwise position shown in dash lines.

It will be understood that the bellcrank 86 must not be permitted to rotate to its dash line position of FIGURE 5 immediately after the last record is dropped from the spindle to the turntable, since in such a case the shut-off lever 56 would immediately be moved to its operative position and the mechanism would be automatically turned off before the last record had been played. Accordingly, a blocking arm shown at 100 in FIGURE 5 is disposed immediately above the end of the bellcrank arm 88 during a record change cycle to prevent the bellcrank 86 from being rotated to its counterclockwise position. At the completion of each change cycle the blocking arm 100 is moved out of the path of the bellcrank arm 88. Consequently, at the completion of the particular record change cycle in which the last record is dropped to the turntable, the rod end 84 will bear downwardly upon the bellcrank arm 87 and rotate the bellcrank to its counterclockwise position, and in this manner the shut-off lever 56 will be moved to its operative position. During the next cycling of the mechanism after the last record has been played, the stud 28 on the gear 22 will engage the ledge portion 76 on the shut-off lever and thereby automatically shut off the mechanism in the manner hereinabove described. When the lever 56 is actuated by the stud 28, the extension 92 on the lever will temporarily be moved away from the bellcrank arm 87, but the lever will be returned to its original position as soon as the switch actuating plate 34 is again rotated to its "on" position by the manual control means V.

FIGURE 1 shows the blocking arm 100 which comprises an upwardly bent tab formed as an integral part of a slide 102. The slide 102 is adapted to move linearly along a path which is approximately parallel to the longitudinal axis of the shut-off lever 56. The slide 100 is movable between a first position as shown in FIGURE 1 wherein the blocking arm 100 is disposed out of the path of the bellcrank arm 88, and a second position as shown in FIGURES 5 and 6 wherein the blocking arm 100 has been moved directly over the arm 88. Referring to FIGURES 1 and 6, a bellcrank 104 is pivotally mounted on a fixed support plate 106 by a pin 107. The bellcrank 104 comprises a first arm 108 which extends downwardly, and a second upwardly extending arm 110 which is linked to a tab 111 on the slide 102 by means of a wire 112. In this manner, movement of the slide 102 between its two positions is controlled by rotation of the bellcrank 104. The slide 102 is biased by a spring 105 (see FIGURE 6) to the blocking position of FIGURES 5 and 6, and it is moved to the position of FIGURE 1 by rotating the bellcrank 104 in a clockwise direction as viewed in FIGURE 6.

A pusher arm 114 is reciprocated during a change cycle through a connection at 113 with the gear 22, and the arm 114 carries a pusher plate 116 which is moved into engagement with the bellcrank arm 108 at the end of a change cycle (see FIGURE 1) so as to rotate the bellcrank to its clockwise position as viewed in FIGURE 6 and thereby pull the slide 102 to the right thus moving the blocking arm 100 out of the path of the bellcrank arm 88. It will now be understood that during a record change cycle the pusher plate 116 moves away from the bellcrank arm 108 and the slide 102 moves to its blocking position wherein the member 100 prevents movement of the bellcrank arm 88. At the end of a record change cycle when the gear 22 has returned to its normal position as shown in FIGURE 1, the pusher plate 116 engages the bellcrank arm 108 and moves the slide to the position of FIGURE 1 wherein the blocking member 100 is disposed out of the path of the bellcrank arm 88, the member 100 thus being held in the latter position until the gear 22 is again rotated during the next record change cycle.

The operation of the automatic shut-off mechanism described hereinabove will now be briefly reviewed. As long as there is at least one record on the spindle which has not as yet been dropped to the turntable the rod portion 84 will be supported in a raised position in the slot 83 and will not engage the bellcrank arm 87. Consequently, the bellcrank 86 and the shut-off lever 56 will under the influence of gravity be disposed in the positions shown in solid lines in FIGURE 5 whereby the ledge portion 76 on the shut-off lever will be positioned beneath the path of travel of the stud 28 on the gear 22 and the shut-off mechanism will be inoperative.

When the last record is dropped to the turntable during a record change cycle the rod portion 84 will bear down upon the bellcrank arm 87 and urge the bellcrank 86 toward its counterclockwise position as shown in dash lines in FIGURE 5, but the blocking arm 100 will engage the associated bellcrank arm 88 and prevent rotation of the bellcrank 86 until the end of the change cycle. When the change cycle has been completed and the playing of the last record initiated, the gear 22 will return to the normal position of FIGURE 1 whereupon the pusher plate 116 will engage the bellcrank arm 108 and rotate the bellcrank 104 in a clockwise direction as viewed in FIGURE 6 so as to move the slide 102 and thereby move the blocking arm 100 out of the path of the bellcrank arm 88 as shown in FIGURE 1. The bellcrank 86 will then be moved to its counterclockwise position as shown in FIGURE 5 by the downward force of the rod portion 84, and the shut-off lever 56 will thereby be tilted to its operative position as shown in dash lines in FIGURE 5.

During the next record change cycle, after the completion of the playing of the last record, the rotation of the gear 22 will cause the stud 28 to engage the ledge portion 76 on the shut-off lever 56 and move the latter from the position of FIGURE 1 to the position of FIGURE 3 thus rotating the actuator plate 34 to the position of FIGURE 3 so as to move the switch button 32 to its "off" position. If the actuator plate 34 is held in its "on" position by the manual control means V, the spring arm 72 on the shut-off lever 56 will deflect in the manner shown in FIGURE 4 to permit the shut-off lever to move relative to the actuator plate 34, and the stud 28 will thus be permitted to push the ledge portion 76 out of its path without causing the plate 34 to be moved to its "off" position and without inflicting any damage to the mechanism.

While we have illustrated our invention in a preferred form, we do not intend to be limited to that form, except insofar as the appended claims are so limited, since modifications coming within the scope of our invention will be readily suggested to others with our disclosure before them.

We claim:

1. In a phonograph record changer of the type having means for dropping a stack of records one at a time to a turntable, a record stabilizer arm mounted on a rod and disposed to overlie the top of a stack of records to stabilize the same, and a large diameter drive gear which is rotated one revolution during each record change cycle, the improvement comprising, in combination, an on-off switch for controlling the operation of the record changer, a rotary switch actuating member rotatable to a first position for moving said switch to its on position and rotatable to a second position for moving said switch to its off position, manual control means associated with said switch actuating member for manual rotation thereof between said first and second positions, automatic shut-off mechanism including an elongated shut-off lever having a pre-loaded spring connection with said switch actuating member for rotating the same to said second position upon actuation of said lever, said spring connection yielding to permit relative movement between said shut-off lever and said switch actuating member in the event said switch actuating member is being held in said first position by said manual control means, actuating means carried on said drive gear for engaging and actuating said shut-off lever during a record change cycle, said shut-off lever being normally disposed in an inoperative position beneath the rotary path of travel of said actuating means so that the actuating means on the drive gear is out of engagement with the lever, said lever being vertically pivotable about a transverse generally horizontal axis to an operative position wherein it is adapted to be engaged by said actuating means, and means actuated by the yielding of said spring for pivoting said shut-off lever to said mentioned inoperative position beneath the rotary path of travel of said actuating means so as to disengage said lever with the actuating means carried on the drive gear.

2. The invention of claim 1 including means for pivoting said shut-off lever to its operative position which comprises a control member disposed beneath the lower end of the rod on which the record stabilizer arm is carried and adapted to be engaged and actuated by said rod after the last record is dropped to the turntable, and wherein one end of said shut-off lever is positioned immediately beneath said control member so as to be pivoted thereby to its operative position upon actuation of said control member.

3. In a photograph record changer of the type having means for dropping a stack of records one at a time to a turntable, a record stabilizer arm mounted on a rod and disposed to overlie the top of a stack of records to stabilize the same, and a large diameter drive gear which is rotated one revolution during each record change cycle, the improvement comprising, in combination, a baseplate, an on-off switch mounted at the underside of said baseplate for controlling the operation of the record changer, a rotary switch actuating member rotatable to a first position for moving said switch to its on position and rotatable to a second position for moving said switch to its off position, an overcenter spring associated with said switch actuating member for assisting in the rotation thereof between its two positions, manual control means associated with said switch actuating member for manual rotation thereof between said first and second positions, a stud projecting downwardly from said baseplate, automatic shut-off mechanism including an elongated shut-off lever mounted on said stud and having a longitudinal slot therein through which said stud projects to permit movement of said lever relative to said stud in an approximately longitudinal direction, said shut-off lever having a spring connection with said switch actuating member for rotating the same to said second position upon movement of said lever in said longitudinal direction, said spring connection being adapted to yield to permit relative movement between said shut-off lever and said switch actuating member in the event said switch actuating member is being held in said first position by said manual control means, a projecting ledge formed on said shut-off lever, an actuating pin projecting downwardly from said drive gear for engaging said projecting ledge during a record change cycle and moving said shut-off lever in said longitudinal direction, said shut-off lever being normally disposed in an inoperative position wherein said ledge is positioned beneath the rotary path of travel of said actuating pin and said lever being pivotable about a transverse generally horizontal axis to an operative position wherein said ledge is adapted to be engaged by said actuating pin, and control means for pivoting said shut-off lever to said operative position after the last record has been dropped to the turntable for playing, said control means being disposed beneath the lower end of the rod on which the record stabilizer arm is carried and adapted to be engaged and actuated by said rod after the last record is dropped to the turntable, one end of said shut-off lever being positioned immediately beneath said control means so as to be pivoted thereby to its operative position upon actuation of said control means.

4. The invention of claim 3 wherein said spring connection between said shut-off lever and said rotary switch actuating member comprises a slot in said shut-off lever, a pin carried by said rotary switch actuating member and projecting through said slot, a spring carried by said lever including a spring arm engaged against said pin so as to maintain the latter at one end of said slot whereby upon longitudinal movement of said lever said spring arm will act upon said pin to rotate said switch actuating member to said second position, said spring arm being flexible whereby in the event said switch actuating member is being held in said first position by said manual control means said spring arm will flex permitting relative movement between said lever and said switch actuating member whereby said pin will move toward the opposite end of said slot.

5. In a phonograph record changer, the combination of a base plate, a switch device mounted to the base plate for controlling operation of the record changer, a rotary switch actuating member rotatable between a first position for closing the switch and a second position for opening the switch, manual control means operatively connected with the switch actuating member for effecting manual rotation of the switch actuating device between its said first and second positions, and automatic shut-off mechanism separately associated with the switch actuating member for rotating the same to its second position, said automatic shut-off mechanism including a longitudinally movable lever reciprocally mounted on the base, and drive means moving said lever in one longitudinal direction after the last record has been played, said switch actuating member including an eccentrically located abutment, the lever having spring means slidingly engaging said abutment, for rotating said switch actuating member to its second position in response to the longitudinal movement of the lever in said direction, and the spring means yielding to permit relative movement between the lever and the switch actuating member in the event said switch actuating member is held against rotation by the manual control means.

6. In a phonograph record changer as defined in claim 5, wherein the lever is also pivotally mounted and includes a further abutment which is engaged by the drive means to move the lever longitudinally in said direction, said abutment on the switch actuating member comprises a pin projecting through an inclined slot provided in the lever and the spring means being loaded to back up the pin and maintain it at the forward end of the slot whereby upon longitudinal movement of the lever said spring means acts upon the pin to actuate the switch actuating member for moving the switch device to its second position, said spring means yielding in the event the switch actuating member is held by said manual control means whereby the pin effectively moves toward the opposite end of the slot as the lever continues to move, so as to effectively cam the lever about its pivotal connection and move its further abutment out of engagement with the drive means.

References Cited by the Examiner

UNITED STATES PATENTS

| 2,295,092 | 9/1942 | Offen | 274—10 |
| 2,868,545 | 1/1959 | Vistain | 274—10 |
| 3,066,941 | 12/1962 | Van Antwerp | 274—10 |

FOREIGN PATENTS

| 567,553 | 12/1958 | Canada. |
| 583,231 | 9/1959 | Canada. |
| 557,520 | 11/1943 | Great Britain. |
| 870,563 | 6/1961 | Great Britain. |

OTHER REFERENCES

Nater et al.: German application No. 1,077,888, publication March 1957.

NORTON ANSHER, *Primary Examiner.*

W. E. JACKSON, J. F. PETERS, *Assistant Examiners.*